United States Patent
Kim et al.

(10) Patent No.: US 9,991,724 B2
(45) Date of Patent: Jun. 5, 2018

(54) BATTERY MANAGEMENT SYSTEM FOR VEHICLE AND CONTROLLING METHOD THEREOF

(71) Applicants: Hyundai Motor Company, Seoul (KR); Kia Motors Corporation, Seoul (KR)

(72) Inventors: Yu Seok Kim, Seoul (KR); Jin Ho Park, Seoul (KR); Kyung In Min, Gyeonngi-do (KR); Jae Hoon Choi, Gyeonggi-do (KR); Dong Gun Kim, Gyeonggi-do (KR); Do Kyoung Lim, Gyeonggi-do (KR); Jun Ho Bang, Gyeonggi-do (KR); Dong Il Kim, Gyeonggi-do (KR); Yoon Jun Lee, Seoul (KR); Hee Tae Yang, Seoul (KR); Kyun Young Ahn, Seoul (KR); Kyung Ho Kim, Gyeonggi-do (KR); Suk Hyung Kim, Gyeonggi-do (KR); Jin Wook Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 144 days.

(21) Appl. No.: 14/947,606

(22) Filed: Nov. 20, 2015

(65) Prior Publication Data
US 2017/0028948 A1   Feb. 2, 2017

(30) Foreign Application Priority Data

Jul. 31, 2015   (KR) .......................... 10-2015-0109056

(51) Int. Cl.
*H02J 7/00* (2006.01)
*B60L 11/18* (2006.01)

(52) U.S. Cl.
CPC ............. *H02J 7/00* (2013.01); *B60L 11/1851* (2013.01)

(58) Field of Classification Search
None
See application file for complete search history.

(56) References Cited

U.S. PATENT DOCUMENTS 5,764,469 A * 6/1998 Slepian ................. H02J 7/0031
361/115
6,320,351 B1 * 11/2001 Ng ......................... H02J 7/0032
320/104

(Continued)

FOREIGN PATENT DOCUMENTS

KR   10-2011-0007660 A   1/2011
KR   10-2014-0074569 A   6/2014

(Continued)

*Primary Examiner* — Jeffrey Zweizig
(74) *Attorney, Agent, or Firm* — Mintz Levin Cohn Ferris Glovsky and Popeo, P.C.; Peter F. Corless

(57) ABSTRACT

A battery management system for a vehicle is provided to prevent current consumption of a battery by operating a relay connected between the battery and electronic loads to prevent an over-discharge of the battery. The battery management system includes a sensing unit that is configured to measure a current and a voltage of a battery for a vehicle and a relay that is connected between the battery for the vehicle and electronic units of the vehicle. Additionally, a controller is configured to receive data from the sensing unit to turn off the relay.

13 Claims, 2 Drawing Sheets

(56) References Cited

U.S. PATENT DOCUMENTS

| | | | |
|---|---|---|---|
| 7,986,055 B2* | 7/2011 | Owens | H02J 1/14 |
| | | | 307/10.7 |
| 8,534,400 B2 | 9/2013 | Stanek et al. | |
| 8,648,603 B2* | 2/2014 | Harada | G01R 31/3679 |
| | | | 324/425 |
| 8,736,101 B2 | 5/2014 | Masuda et al. | |
| 9,437,850 B2* | 9/2016 | Brockman | G01R 31/3606 |
| 2013/0181516 A1 | 7/2013 | Phan | |
| 2014/0159670 A1 | 6/2014 | Lee et al. | |
| 2014/0253045 A1* | 9/2014 | Poznar | H02J 7/0063 |
| | | | 320/136 |
| 2015/0303716 A1* | 10/2015 | Lee | H02J 7/0054 |
| | | | 307/10.1 |

FOREIGN PATENT DOCUMENTS

| | | |
|---|---|---|
| KR | 10-2014-0090881 | 7/2014 |
| KR | 10-2015-0018187 | 2/2015 |
| KR | 10-2015-0022110 | 3/2015 |
| KR | 10-1530071 B1 | 6/2015 |

\* cited by examiner

BATTERY MANAGEMENT SYSTEM FOR VEHICLE AND CONTROLLING METHOD THEREOF

CROSS-REFERENCE TO RELATED APPLICATION

This application is based on and claims the benefit of priority to Korean Patent Application No. 10-2015-0109056, filed on Jul. 31, 2015 in the Korean Intellectual Property Office, the disclosure of which is incorporated herein in its entirety by reference.

TECHNICAL FIELD

The present disclosure relates to a battery management system for a vehicle and a controlling method thereof, and more particularly, to a technology of controlling a relay between a battery and electronic loads.

BACKGROUND

In general, electronic devices for a vehicle, for example, an image recording apparatus, a path guiding apparatus, an audio and video device for a vehicle, and the like are connected to an outlet (e.g., 12V power outlet) within the vehicle to be supplied with power. Among the electronic devices for the vehicle, there are devices that require a continuous supply of power and require to be operated even after an ignition of the vehicle is turned off.

In particular, a black box for a vehicle is a representative example. Since the black box for the vehicle performs a function of preparing for a traffic accident, an artificial vehicle damage accident during parking of the vehicle, or the like by recording situations while the vehicle is being driven and situations during the parking of the vehicle, the black box requires a continuous supply of power from the vehicle as long as the black box does not use a self-battery. However, since a battery for a vehicle has limited capability of about 60 AH to 100 AH, a charged battery may be fully discharged and it may be impossible for the vehicle to be driven, when a generator is not operated since the ignition of the vehicle is not turned on.

Therefore, a technology related to an apparatus for preventing an over-discharge of a battery for a vehicle which is installed between the electronic devices for the vehicle and the battery for the vehicle and prevents a power supply to the electronic devices for the vehicle when a voltage of the battery is less than a predetermined level has been proposed.

SUMMARY

The present disclosure provides a battery management system for a vehicle capable of preventing current consumption of a battery by controlling a relay connected between the battery and electronic loads to prevent an over-discharge of the battery, and a controlling method thereof.

Other objects and advantages of the present disclosure can be appreciated by the following description and will be clearly described by the exemplary embodiments of the present disclosure. It will be easily known that the objects and advantages of the present disclosure can be implemented by means and a combination thereof shown in the appended claims.

According to an exemplary embodiment of the present disclosure, a battery management system for a vehicle may include a sensing unit configured to measure a current and a voltage of a battery for a vehicle; a relay connected between the battery for the vehicle and electronic units of the vehicle; and a controller configured to receive data from the sensing unit to turn off the relay.

When a state of charge (SOC) of the battery for the vehicle is a predefined sleep reference value or less, the controller may be configured to turn off the relay. When a state of health (SOH) of the battery for the vehicle is a predefined sleep reference value or less, the controller may be configured to turn off the relay. When driving of the vehicle ends, the controller may be configured to receive the data from the sensing unit every a predefined sleep time (e.g., at each interval). When a sleep time varied based on the current and the voltage measured by the sensing unit elapses, the controller may be configured to receive the data from the sensing unit.

The battery management system may further include an off-switch configured to receive an off signal from the controller to turn off the relay. Additionally, the battery management system may include an on-switch turning on the relay based on a user manipulation, wherein the relay and the battery for the vehicle may be connected to each other by a parallel circuit. The battery management system may further include an on-switch configured to turn on the relay based on a user manipulation.

The on-switch may be disposed on an electric circuit that connects the vehicle battery and the relay. When the battery is not charged within a predefined standby time after the on-switch turns on the relay, the controller may be configured to turn off the relay. When the battery is not charged within a predefined standby time after the on-switch turns on the relay, the sensing unit may be configured to transmit data of the voltage and the current of the battery to the controller.

According to another exemplary embodiment of the present disclosure, a controlling method of a battery management system for a vehicle may include terminating driving of an engine; measuring a voltage and a current of a battery for a vehicle; and in response to determining based on the measured voltage and current that a measured state of the battery is a predefined sleep reference value or less, turning off a relay connected between the battery for the vehicle and electronic units of the vehicle.

When the state of the battery is the predefined sleep reference value or greater, the measuring of the voltage and the current may be repeated after a sleep time elapses. The sleep time may be varied based on a difference between the state of the battery and the sleep reference value. The controlling method may further include turning on the relay by a user manipulation. When the battery for the vehicle does not start to be charged within a predefined standby time after the turning on of the relay, the turning off of the relay may be repeated.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
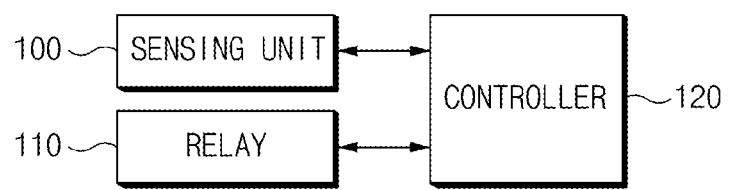
FIG. 1 is a diagram illustrating a battery management system for a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The above-mentioned objects, features, and advantages will become obvious from the detailed description which is described below in detail with reference to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make the gist of the present disclosure unclear, it will be omitted. Hereinafter, exemplary embodiments of the present disclosure will be described in detail with reference to the accompanying drawings.

According to the present disclosure, a charging method of an eco-friendly vehicle that uses power as a power source, such as a plug-in hybrid vehicle or an electric vehicle, is suggested. It is to be noted that the vehicle targeted to the charging is not necessarily limited to the name described in the present disclosure, and a concept of the present disclosure may be applied to various apparatuses which are charged in a plug-in scheme.

FIG. 1 is a configuration diagram illustrating a battery management system for a vehicle according to an exemplary embodiment of the present disclosure. Referring to FIG. 1, a battery management system for a vehicle may include a sensing unit 100, a relay 110, and a controller 120. The sensing unit 100 may be configured to measure a current and a voltage of a vehicle battery and may include a plurality of sensors including a power circuit unit, a voltage sensing and cell balancing unit, a current and temperature sensing relay controller, a communicating unit, and the like.

In particular, the power circuit unit may be configured to calculate a state of charge (SOC) and a state of health (SOH) of the battery every a predetermined time (e.g., for every predetermined time interval), measure the voltage, may include a real time clock (RTC), and may be configured to transmit a time signal to the battery management system for the vehicle every a predetermined time. The voltage sensing and cell balancing unit may be configured to execute a voltage sensing and balancing of a unit cell of the battery. Particularly, the voltage sensing and cell balancing unit may be configured to receive a voltage sensed signal from the battery and transmit a cell balanced signal to the battery.

The current and temperature sensing relay controller may include plurality of sensors configured to measure currents and temperatures, and turn-on or off of the relay between the battery and electronic units based on sensed currents and temperatures. The communicating unit may be configured to use a local interconnect network (LIN) communication method, a controller area network (CAN) communication method, or the like, as a communication method between the battery and the battery management system for the vehicle. The relay 110, which may be configured to turn a current on or off between the battery and the electronic units, may be configured to prevent an over-charge or an over-discharge of the battery and prevent consumption of the current of the battery by dark currents flowing in the electronic units.

The controller 120, which may be configured to operate the sensing unit 100 and the relay 110, may be connected to a variety of sensors or components included within the sensing unit through a circuit, and execute a power transfer operation of the relay and an interruption of the power transfer operation of the relay based on data received via the connected circuit. When the SOC of the battery for the vehicle or the SOH of the battery for the vehicle is a predefined sleep reference value or less, the controller 120 may be configured to turn off the relay 110.

In addition, the controller 120 may be configured to receive the data from the sensing unit 100 every a predefined sleep time when driving of the vehicle is ended, and may be configured to receive the data from the sensing unit 100 when the sleep time varied based on the currents and the voltages measured by the sensing unit 100 elapses. In addition, when the battery is not charged within a predefined standby time after an on-switch turns on the relay 110, the controller 120 may be configured to turn off the relay 110.

Figure 2:
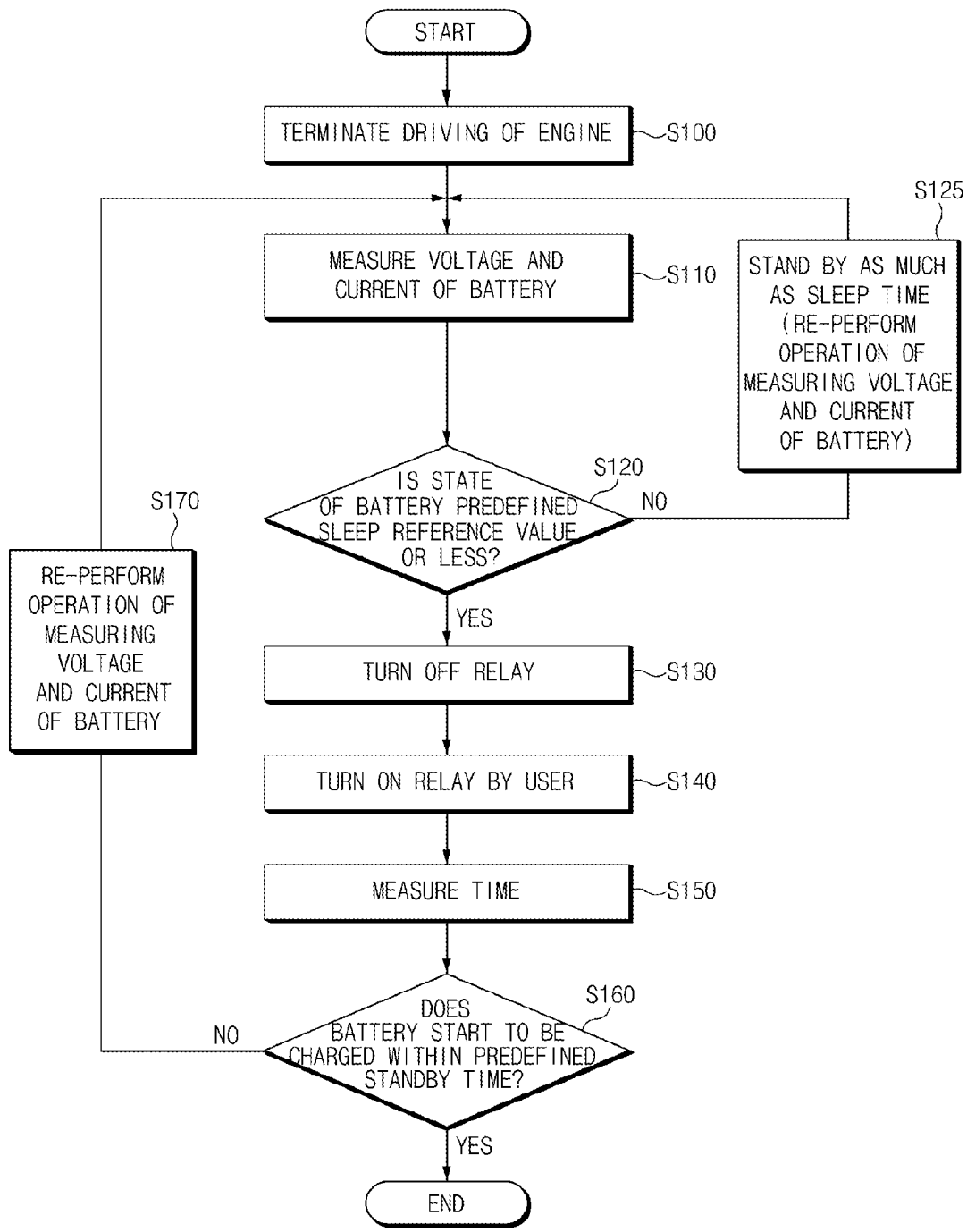
FIG. 2 is a flowchart illustrating a controlling method of a battery management system for a vehicle according to an exemplary embodiment of the present disclosure.

FIG. 2 is a flowchart illustrating a controlling method of a battery management system for a vehicle according to an exemplary embodiment of the present disclosure. Retelling to FIG. 2, a battery management system for a vehicle according to an exemplary embodiment of the present disclosure may include a sensing unit configured to measure a current and a voltage of a battery for a vehicle, a relay connected between the battery for the vehicle and electronic units of the vehicle, and a controller configured to receive data from the sensing unit to turn off the relay.

Hereinafter, a controlling method of a battery management system for a vehicle will be described in detail. When a driver or a user terminates driving of an engine, the battery management system for the vehicle may be configured to measure the voltage and the current of the battery for the vehicle (S100 and S110). In response to determining based on the measured voltage and current that a measured state of the battery (e.g., an SOC and SOH of the battery) is a predefined sleep reference value or less, the battery management system for the vehicle may be configured to turn off the relay connected between the battery for the vehicle and the electronic units of the vehicle (S120 and S130).

However, in response to determining based on the measured voltage and current that the measured state of the battery is the predefined sleep reference value or greater, the battery management system for the vehicle may be configured to maintain a standby mode during a sleep time period (S125). In particular, the sleep time may be varied based on a difference between the state of the battery and the sleep reference value. In addition, the battery management system for the vehicle may be configured to repeat the measurement of the voltage and the current of the battery for the vehicle. When the driver or the user turns on an ignition of the vehicle (e.g., the controller receives a turn on signal) or turns on the relay to drive the vehicle, the sensing unit of the battery management system for the vehicle may be configured to measure a time (e.g., initiate a timer) (S140 and S150). As a method for turning on the relay described above, various methods may be used.

When the battery begins to charge within the predefined standby time, the battery management system for the vehicle may be configured to start the driving of the vehicle (S160). However, when the battery does not begin charging within the predefined standby time, the battery management system for the vehicle may be configured to repeat the measurement of the voltage and the current of the vehicle battery and may be configured to turn off the relay (S170).

As described above, according to the exemplary embodiments of the present disclosure, lifespan of the battery may be extended. Further, according to the exemplary embodiments of the present disclosure, a lithium battery may be used as the battery, thereby making it possible to improve fuel efficiency of the vehicle and improve assembly property of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A battery management system for a vehicle, comprising:
   a sensing unit configured to measure a current and a voltage of a battery for a vehicle;
   a relay connected between the battery for the vehicle and electronic units of the vehicle; and
   a controller configured to receive data from the sensing unit to turn off the relay wherein in response to determining based on the measured voltage and current that a measured state of the battery is a predefined sleep reference value or greater, the controller for the vehicle is configured to maintain a standby mode during a sleep time period and measure voltage and current.

2. The battery management system according to claim 1, wherein when a state of charge (SOC) of the battery for the vehicle is the predefined sleep reference value or less, the controller is configured to turn off the relay.

3. The battery management system according to claim 1, wherein when a state of health (SOH) of the battery for the vehicle is the predefined sleep reference value or less, the controller is configured to turn off the relay.

4. The battery management system according to claim 1, wherein when driving of the vehicle ends, the controller is configured to receive the data from the sensing unit at every predefined sleep time.

5. The battery management system according to claim 1, wherein when a sleep time varied based on the current and the voltage measured by the sensing unit elapses, the controller is configured to receive the data from the sensing unit.

6. The battery management system according to claim 1, further comprising:
   an on-switch configured to turn on the relay based on a user manipulation.

7. The battery management system according to claim 6, wherein when the battery is not charged within a predefined standby time after the on-switch turns on the relay, the controller is configured to turn off the relay.

8. The battery management system according to claim 6, wherein when the battery is not charged within a predefined standby time after the on-switch turns on the relay, the sensing unit is configured to transmit data of the voltage and the current of the battery to the controller.

9. A controlling method of a battery management system for a vehicle, comprising:
   measuring, by a controller, a voltage and a current of a battery for a vehicle in response to driving of an engine being terminated; and
   in response to determining based on the measured voltage and current that a measured state of the battery is a predefined sleep reference value or less, turning off, by the controller, a relay connected between the battery for the vehicle and electronic units of the vehicle and in response to determining based on the measured voltage and current that a measured state of the battery is the predefined sleep reference value or greater, the controller for the vehicle is configured to maintain a standby mode during a sleep time period and measure voltage and current.

10. The controlling method according to claim 9, wherein when the state of the battery is the predefined sleep reference value or greater, the measuring of the voltage and the current is repeated after a sleep time elapses.

11. The controlling method according to claim 10, wherein the sleep time is varied based on a difference between the state of the battery and the sleep reference value.

12. The controlling method according to claim 9, further comprising:
   turning on, by the controller, the relay based on a user manipulation.

13. The controlling method according to claim 12, wherein when the battery for the vehicle does not begin charging within a predefined standby time after the turning on of the relay, the turning off of the relay is repeated.

* * * * *